2,802,000

UNGELATINIZED COLD WATER SOLUBLE STARCH ETHERS

Carlyle G. Caldwell, Plainfield, and Irving Martin, New Market, N. J., assignors to National Starch Products Inc., New York, N. Y., a corporation of Delaware No Drawing. Application August 13, 1953, Serial No. 374,126

6 Claims. (Cl. 260—233.3)

Our invention relates to a new process resulting in the production of novel and valuable starch derivatives, namely, ungelatinized, cold water soluble starch ethers.

This application is a continuation-in-part of our now abandoned application, Serial No. 168,386, filed June 15, 1950.

Water-dispersible ethers of starch have heretofore fallen into two broad classes: (1) that wherein the starch derivative exists in the form of its ungelatinized granules, and must be cooked in water in order to obtain a homogeneous dispersion (or "solution") and (2) that class wherein the starch granule has been gelatinized and dispersed, through action of heat and/or chemicals, and dried, so that the dry derivative may be redispersed (or "dissolved") in water at normal room temperatures.

We have now succeeded in producing a new class of starch ethers, namely, one wherein although the starch ether exists in the form of its original, ungelatinized starch granules it may nevertheless be dispersed (or "dissolved") in water at normal room temperatures. This combination of characteristics—ungelatinized, granular form together with cold water solubility, has not heretofore been found, to the best of our knowledge, in any starch derivative. Both our process and product are marked by notable advantages, which will be discussed subsequently.

Before entering into the description of our invention, it would be well to explain the use of such terms as "cold water solubility" and "dispersion," in relation to starches and starch derivatives. Raw starches exist in the form of discrete granules. When suspended in water at normal room temperatures, these granules, in the absence of agitation, soon settle to the bottom. Under the influence of heat and/or certain chemicals, such as alkalis, the granules in the presence of water go through a process which first consists of the swelling of the granules and is followed by their disruption and dispersal throughout the liquid medium. This disruption and dispersion of the starch granules is usually referred to as "gelatinization." As opposed to the mere temporary suspension of ungelatinized starch granules in water, a gelatinized starch forms a relatively stable, hydrated colloidal dispersion. A gelatinized starch dispersion which has been dried will ordinarily, upon remixing with sufficient water, at room temperatures, form a hydrated colloidal dispersion. Although such dispersions are not true solutions, the term "cold water soluble" is often applied to starches which are capable of forming relatively homogeneous and stable hydrated colloidal dispersions in water at normal room temperatures.

Thus, when we use terms such as "soluble" or "dissolved" as applied to the action of our starch products in water, we refer to the fact that they are able to form or have formed stable, homogeneous, hydrated colloidal dispersions. Similarly, when we refer to a starch as being "dispersed" in water, we have reference to this type of dispersion.

It will be seen that one of the most novel features of the starch product of our invention is that it is cold water soluble, in spite of the fact that it has not been pregelatinized, i. e., its original discrete granular structure has not been disrupted.

We have discovered that ungelatinized, cold water soluble starch ethers may be made by a process which does not require suspension or dispersion of the starch in water at any time. By our process, starch having a moisture content not substantially greater than that of commercially dry starch is treated with a suitable etherification reagent and with an aqueous solution of a base in a quantity and concentration sufficient to swell the starch granules but not sufficient to gelatinize the starch or to form an aqueous suspension. At no time during our etherification process is the starch in aqueous suspension or dispersion; the reaction mixture is always a granular, non-liquid mass.

By one prior method, starch in alkaline aqueous suspension is treated with an etherification reagent. That method invariably results in a hydrated colloidal dispersion ("solution") of the starch product, since even if the raw starch were not immediately gelatinized and dispersed by the combination of water, alkali and, frequently, heat, then, in any case, the resulting ether, being a cold water soluble product, must, of course, dissolve in the water. In order to produce a dry, cold water soluble product, this dispersion would have to be dried, as on heated drums, or, alternatively, the starch ether might be separated from the dispersion by relatively expensive and cumbersome precipitation methods, such as alcohol precipitation.

By another variation of the old methods, starch is pregelatinized and dried, forming an ordinary cold water soluble starch. The dry material is blended with an etherification reagent and alkali; in such cases the actual etherification takes place when the starch product is dispersed in water and heated.

Still another variation involves passing a mixture of starch, water, etherification reagent and alkali over heated drums, resulting in the simultaneous gelatinization, etherification and drying of the starch.

In none of the above-listed known methods does the final starch ether exist in the form of discrete, ungelatinized starch granules. When examined microscopically with plane polarized light, substantially all of the granules of the previously known cold water soluble starch ether types are no longer birefringent—that is, they no longer show the polarization crosses which are a decisive and generally acknowledged characteristic of ungelatinized starches.

On the other hand, when the cold water soluble starch ethers of our invention are examined microscopically with plane polarized light, it is found that the major proportion of the granules are birefringent, showing the polarization crosses typical of ungelatinized starch.

We shall list the advantages of our process and product in detail, after the following description of our procedure.

As the raw material for our process we may use any ungelatinized starch, such, for example, as is derived from corn, potato, wheat, sago, tapioca, sweet potato, rice or waxy maize. The starch may be in its original raw form, or it may have undergone previous chemical modification, such as esterification or etherification, oxidation, partial hydrolysis by acids, or the like, provided always that the starch or starch derivative or conversion product must still retain the substantially unbroken, ungelatinized granule structure of the original raw starch. It may be used in commercially dry form or, in some cases, may be pre-dried to various lower moisture contents.

As the etherification reagent we may employ any chemical which will undergo an etherification reaction with starch in the presence of alkali. Examples of such etherification reagents include the halogenated fatty acids and their salts or esters (e. g., monochloracetic acid, sodium monochloracetate, beta-chloropropionic acid), thereby producing carboxyalkyl starch ethers, reaction with the monochloracetic acid or its salt yielding a carboxymethyl starch ether and reaction with beta-chloropropionic acid yielding a carboxyethyl starch ether; alkyl halides or sulfates, in which the alkyl group contains preferably not more than 3 carbon atoms (e. g., ethyl chloride, dimethyl sulfate, diethyl sulfate), thereby producing alkyl starch ethers, reaction with ethyl chloride or diethyl sulfate yielding ethyl starch ethers and reaction with dimethyl sulfate yielding methyl starch ethers; epoxides or substituted epoxides (e. g., propylene oxide, ethylene oxide, or epoxyalkyl sulfonates such as sodium 2,3-epoxypropane sulfonate); halohydrins or substituted halohydrins (e. g., ethylene chlorohydrin, propylene chlorohydrin, sodium 2-hydroxy-3-chloropropane sulfonate) thereby producing hydroxyalkyl starch ethers; haloalkyl sulfonates (e. g., sodium 2-chloroethanesulfonate, sodium 2-bromoethanesulfonate) thereby producing alkyl sulfonic acid starch ethers. The above reagents are listed merely by way of illustration and not limitation, since we may use any reagent capable of forming an ether linkage with starch so as to result in a cold water soluble derivative. It is well known in the art that certain types of etherification reagents will not, by themselves, solubilize starch. Thus, we would not use as the sole etherification reagents chemicals such as epihalohydrins or aliphatic dihalides, wherein two functional groups of the reagent (i. e., the epoxy group and the halogen of the epihalohydrin, or the two halogens of the aliphatic dihalide) react with two hydroxyl groups of the starch molecule, or with one hydroxyl group in each of two starch molecules, resulting in a cross-linking which reduces rather than increases solubility. Similarly, we would not use as the sole etherification reagents materials which introduce strongly hydrophobic groups, such, for example, as benzylchloride, since such reagents by themselves could not bring about cold water solubility. On the other hand, one may employ mixtures of two or more etherification reagents, in order to introduce certain desired properties. One may even employ relatively small proportions of hydrophobic or polyfunctional etherification reagents, if desired, so long as there is always used therewith enough of a monofunctional, hydrophilic etherification reagent to result in a cold water soluble starch ether. It is understood, of course, that when one employs two or more etherification reagents, these reagents need not necessarily be used in physical admixture. Thus, one may start with a starch which has already been treated with one etherification reagent and subsequently treat that starch derivative with another etherification reagent.

By the term "base" we mean to include any chemical with a basic reaction. Thus, we may employ strong bases such as sodium or potassium hydroxides, or weaker bases of the type of sodium carbonate.

The mechanism of our process is simple, and since we do not have to work with a cohesive, gelatinized starch mass, the use of high powered, heavy-duty mixing equipment is not required. Ordinary dry blending equipment suffices in many cases, although an autoclave is desirable when the particular etherification reagent employed is relatively volatile and a certain amount of pressure might thus be produced under the conditions of the reaction. The blender or autoclave is ordinarily jacketed so as to permit heating or cooling of the reaction mass, when desired.

Starch is placed in the mixer, and the base (such as sodium hydroxide or the like) is added, with suitable agitation. As we have already stated, it is necessary to have a base solution of suitable concentration. The mechanism by which we add the base solution in suitable concentration to the dry starch is by incorporating the base solution or aqueous base in the form of fine particles into the dry starch. The entire reaction between the dry starch, the aqueous base and the etherification reagent is carried out as a granular, non-liquid mass, the reacting mass of dry starch, aqueous base particles and etherification reagent being maintained in a granular, non-liquid state. This may be achieved either by spraying an aqueous base solution on to the starch or the base solution may be formed in situ within the starch mass by adding the dry base to the starch and subsequently spraying on sufficient water so that, considering the total amount of base added and the total amount of water added, a base solution of the required concentration will have been achieved. The latter method of adding the base in dry form is sometimes preferred because it obviates the difficulty which may be caused by the release of caustic mist in the air as a result of spraying the solution on to the starch. Also spraying water on to starch which already contains the dry base requires lower spraying pressures than are required for spraying concentrated base solutions. When adding liquids such as water, base solution or reagents to the starch, any suitable means of incorporating the liquid with the starch may be employed, but we ordinarily prefer the spraying method since it results in most uniform distribution. The etherification reagent is then added; this may also be done by spraying, if the reagent is normally a liquid, or can be liquefied by heating. If it is a water soluble solid, then an aqueous solution of the reagent may be used. It can also be added to the starch in the form of a dry powder, or as a gas, if this is its normal state. It will be apparent that the form in which the reagent is added must depend to a great extent upon the particular reagent chosen. Although we prefer to add the base to the starch first, followed by the etherification reagent, it is possible to reverse this order, or to add both materials simultaneously. The reaction is allowed to continue until complete. Agitation is maintained at least during the addition of the base and the reagent.

We shall now discuss the variables and reaction conditions involved in our process.

*Proportions.*—We have already pointed out that the starch should be swelled, without undergoing actual gelatinization and disruption of the granules. It is this swelling which permits a greater diffusion of the reagents within the starch structure, which in turn permits a degree and uniformity of substitution sufficient to bring about cold water solubility. Furthermore, ours is a dry process and, at no time, must the starch be in liquid suspension. These factors directly affect the proportions and concentrations of base solution and etherification reagent, as well as the temperatures of the reaction.

*Base.*—Two functions of the base in our reactions are (1) to swell the starch granules, thus making certain regions of the granule more readily accessible to the etherification reagent and (2) to catalyze the etherification reaction.

If an acid by-product results from the reaction, base is of course consumed thereby. In such cases, the minimum amount of base to be used is a quantity equivalent to or slightly in excess of the amount which will be so consumed. Thus, the final starch derivative product will be neutral or only slightly alkaline, making unnecessary any subsequent removal of alkali by washing or neutralization. If base is not consumed during the reaction, because of the absence of acid by-product formation, then the minimum amount of base to be used is that which will result in a reasonable reaction rate. Thus, with propylene oxide as the etherification reagent, we have used as little as 0.5% sodium hydroxide or sodium carbonate (calculated on the starch). If the amount of base used is such as to leave any un-neutralized base at the end of the reaction, then residual base may be neutralized, if desired, in the usual manner, after completion of the reaction.

As stated, the base may be added to the starch in dry form, followed by addition of water, or one may add an aqueous base solution. But this very combination of starch-base-water involves the danger of gelatinizing the starch unless care is exercised in choosing the ratios of base-to-water and base-to-starch. If gelatinization of the starch were permitted to occur, in our process, several disadvantages would result. Firstly, the crumbly, relatively granular reaction mixture would become a doughy mass, difficult to handle and mix, and probably requiring expensive, heavy-duty mixing equipment. Secondly, the product resulting from the reaction, being doughy rather than granular, would, in all likelihood, need to undergo the additional steps of drying and grinding (relatively expensive and cumbersome procedures when dealing with gelatinized starches). Thirdly, the ground, gelatinized starch derivative, when dispersed in water, would have a substantially greater tendency toward lump formation than our ungelatinized granular derivative. It will be clear, therefore, that gelatinization of the starch prior to or during our process is to be avoided.

We have discovered that the gelatinizing effect of base solutions, such as aqueous sodium hydroxide, decreases as the concentration of the base solution is increased beyond a certain point. Thus, whereas 100 grams of corn starch will be gelatinized at about 30° C. by approximately 300 grams of a 1% aqueous solution of sodium hydroxide, and only about 46 grams of a 5% solution of the base are required to gelatinize the same amount of starch, it is found that as the concentration of the base solution is further increased, larger quantities are required for gelatinization of the starch. Thus, approximately 56 grams of a 15% solution, or 189 grams of a 35% solution, or 237 grams of a 50% solution of the base are required in order to gelatinize 100 grams of corn starch. Although this principle applies also to starch types other than corn, the absolute figures will, of course, not necessarily be the same, since starches vary in case of gelatinization.

The above-mentioned principle must be kept in mind when choosing the concentration and quantity of base solution for incorporation with the starch. It should be remembered that when we speak of incorporating a base solution with the starch, we refer not only to the addition of an aqueous base solution to the starch but also to the formation within the starch mass of such a solution by adding the dry base to the starch and subsequently adding the necessary amount of water to produce a solution of the required concentration. For example, if one wishes to have a 50% sodium hydroxide solution, one may of course dissolve sodium hydroxide in an equal weight of water. But an equivalent way of making the solution would be to add the dry sodium hydroxide to the starch and subsequently spray on to the starch an amount of water equal in weight to the amount of sodium hydroxide used.

While 100 grams of sodium hydroxide, in the form of a 50% aqueous solution, may be added to 100 grams of corn starch, at about 30° C., without causing gelatinization; the same 100 grams of sodium hydroxide added in the form of a 30% aqueous solution will gelatinize the starch. Note that the maximum amount of any given base concentration which can be used, without causing gelatinization, decreases as the temperature increases. Likewise, the maximum amount of any given base concentration which can be used, without causing gelatinization, decreases with increasing degree of preconversion of the particular starch employed (i. e., whereas a given amount of base solution will gelatinize a so-called "thin-boiling" starch, produced by acid conversion, that same amount and concentration of base may not gelatinize a raw, unconverted starch). It should also be observed that certain etherification reagents tend to cause a swelling of the starch in addition to the swelling produced by the base solution alone. This factor must therefore be kept in mind when choosing the particular type, amount and concentration of the base solution, in order to avoid gelatinization of the starch.

Confronted with the necessity of using enough base (to obtain adequate swelling, to catalyze the etherification reaction and to consume such acid by-products as may be formed) and, on the other hand, to avoid gelatinization of the starch or formation of an aqueous starch suspension, it will ordinarily be found that use of the more concentrated base solutions (whether by addition of the solution or by formation in situ) will permit incorporation of the required amount of base without gelatinization or suspension of the starch.

We prefer to use strong bases, such as sodium hydroxide, in aqueous solutions ranging from approximately 5% to 80% concentration and usually from about 10% to 80%. If it is desired to use sodium hydroxide of more than about 50% concentration, the base may be added in molten condition; e. g., by heating to the appropriate temperature and preferably spraying onto the starch. When adding the base to the starch in dry form, it is preferable that the base be in as finely subdivided form as possible in order to achieve the most uniform distribution within the starch. Thus, when using sodium hydroxide we prefer to use the powdered material, although it is entirely feasible to add the dry sodium hydroxide in flake form and then to grind the dry starch-sodium hydroxide flake mixture so as to produce the desired homogeneous, powdered mass. If a relatively weak base, such as sodium carbonate, is to be used, a saturated or almost saturated solution is most likely to introduce the requisite amount of base without forming a suspension or causing gelatinization (it being remembered that here too, the solution may be added as such or may be formed in situ).

It should be further noted that if the quantity of base solution used swells the starch too close to the gelatinization point, then an undesirable caking of the mass sometimes occurs, making mixing difficult. The optimum amount of base solution is therefore that which will swell the starch granules but still leaves them in a relatively friable, free-flowing, non-caking state.

It is sometimes found that the use of a given reagent will require an amount of base larger than may safely be added in solution form without causing gelatinization. In such cases, a portion of the base may be added to the starch in solid form.

*Etherification reagent.*—The amount of etherification reagent to be used will vary among the individual reagents and the particular chemical groups being introduced into the starch molecule. A reagent which is of relatively low reaction efficiency and weakly hydrophilic character will need to be used in greater quantities, in order to produce a cold water soluble derivative, than a reagent of high reaction efficiency and strongly hydrophilic character. Furthermore, it will require a greater quantity of reagent to solubilize a raw, untreated starch than a starch which has already been degraded to some extent by acid hydrolysis or similar treatment. We have produced ungelatinized, cold water soluble starch derivatives by using as little as 1% of etherification reagent, based on the starch, and in other cases have found it necessary to use as much as 62% of the reagent. In view of the great number of possible etherification reagents and their varying reaction efficiencies, the many possible types and degrees of preconversion of starches, and other variables such as time and temperature of reaction, it will be seen that it is impossible to set down precise quantities of reagents to be used. But since the ultimate goal, the production of a cold water soluble starch, is ascertainable by the simplest of tests—it will not be difficult for one familiar with the art to vary the quantity of etherification reagent in this process until he does achieve the desired goal of cold water solubility. It should be pointed out that it is sometimes found desirable to use more than the minimum amount of etherification reagent which is necessary to bring about cold water solubility, in order to impart other desired properties to the final product.

*Temperature.*—The greater the reactivity and the rate of diffusion of a given etherification reagent, the lower the temperature that is ordinarily required. Since swelling facilitates diffusion, the greater the degree of starch swelling the lower is the required temperature. In no case, of course, may the temperature be so high as to cause gelatinization of the starch. We have successfully carried out the process of our invention at temperatures as low as 5° C. and as high as 135° C., these temperatures being chosen in the light of the circumstances of the particular reaction.

*Time.*—The time required to complete the reaction will depend upon many variables, such as the particular starch and reagents employed, the proportion of the reagents and the temperature. We have obtained cold water soluble derivatives in some cases after only 4 hours treatment; in other cases a week was required. Reaction of the starch, base and etherification reagent is continued, in any event, until the reaction is complete. This is easily checked, for example, by removing samples of the reaction product at intervals and testing for cold water solubility. When the product is cold water soluble, the reaction may be considered complete, for the purposes of this process. Other simple tests will also indicate completion of the reaction. Thus, if the reaction is one wherein alkali is consumed (due to the formation of acid by-products), then occasional pH measurements will indicate the point at which alkali is no longer being consumed; this marking, of course, the completion of the reaction. If the reaction is one wherein alkali is not consumed, and the etherification reagent is relatively volatile (as, for example, propylene oxide), the reaction being therefore carried out in an autoclave, it will be found that the pressure within the vessel drops as the reagent is consumed. When the pressure remains constant, the reaction may be assumed to have been completed.

As already stated, the final products of our invention are characterized not only by their solubility in water at normal room temperatures, but also by the fact that the starch granules are substantially unruptured and ungelatinized, as indicated by the fact that when examined microscopically with plane polarized light, substantially all of the granules of our products are birefringent, that is, they show polarization crosses.

The following examples will further illustrate the embodiment of our invention. It should be noted that in these examples all parts given are by weight, and the starch, unless otherwise indicated is of normal moisture content. We further wish to point out that in all of the examples the starch is preferably of a fineness such that substantially all will pass through a 200 mesh screen.

EXAMPLE I

In a jacketed blender, 100 parts of corn starch of normal moisture content were swept with nitrogen and sprayed with 24.6 parts of a 40% aqueous sodium hydroxide solution, maintaining the temperature at a maximum of 23°C. After about five minutes there were added, by spraying, 16 parts of a 75% aqueous solution of monochloracetic acid, keeping the temperature at a maximum of 34° C. Continuous agitation was maintained throughout the reaction. During the next four hours the temperature was permitted to rise spontaneously, and a maximum of 48° C. was attained. Nitrogen was circulated continuously during this period, at such a rate as to reduce the moisture content by the end of the period to about 18.5% as determined by heating a sample in a constant temperature oven at 130° C. for 4 hours, the mixer cover having an opening which permitted moisture evaporation. The reaction was then allowed to continue for approximately one hour at 60–65° C., an additional hour at 70–75° C., and finally for about 2½ hours at 80–85° C., after which the mass was cooled to room temperature.

The product was granular and relatively free-flowing. It dissolved readily in cold water, with substantially no lump formation. It had a moisture content of 7% and a pH, in 8% aqueous solution, of 9.7. When a smear of the product in mineral oil was examined microscopically with plane polarized light, substantially all of the granules showed polarization crosses, in the manner of the original ungelatinized corn starch before the reaction.

The reason for sweeping the starch with nitrogen was to reduce the moisture content of the starch. Air could also have been used, but when employing air to reduce moisture content it should be remembered that the carbon dioxide normally present in air may react with some of the base in the starch reaction mass. Thus, in such cases, when calculating the amount of base to be added to the starch, this possible loss factor should be kept in mind.

EXAMPLE II

Example I was repeated, except that the starch consisted of a mixture of 50 parts corn starch and 50 parts of an ungelatinized etherified starch derivative made by suspending corn starch in 1½ times its weight of water, adding 0.8% of sodium hydroxide and 0.125% of epichlorohydrin (based on the dry weight of the starch), agitating at room temperature 16 hours, neutralizing to pH 7, filtering, washing and drying. The final product was comparable to that of Example I.

EXAMPLE III

Example I was repeated, except that after the four hour period mentioned therein the reaction mixture was allowed to stand at room temperature in a closed container for about a week. The moisture content of the final product was 19%, and its properties were comparable to those of Example I.

EXAMPLE IV

The procedure of Example III was repeated, using the following ingredients:

| | Parts |
|---|---|
| Corn starch | 100 |
| 30% aqueous sodium hydroxide solution | 25.6 |
| 75% monochloracetic acid solution | 11.8 |

The properties of the final product were comparable with those of Example I.

EXAMPLE V

The procedure of Example III was repeated, using the following ingredients:

| | Parts |
|---|---|
| Corn starch | 100 |
| 49.4% aqueous sodium hydroxide solution | 24.3 |
| 75% monochloracetic acid solution | 18.6 |

The properties of the final product were comparable with those of Example I.

EXAMPLE VI

The ingredients were as follows:

| | Parts |
|---|---|
| Waxy maize starch | 100 |
| 76% aqueous sodium hydroxide solution | 28.7 |
| Sodium monochloracetate (solid) | 62 |

The sodium hydroxide solution, which was kept in a molten condition by heating, was sprayed onto the starch. The sodium monochloracetate was dusted in slowly. Agitation was maintained for four hours, during which a maximum temperature of about 35° C. was attained. The reaction mixture was then allowed to stand in a closed container at room temperature for about four weeks. Sweeping with nitrogen or air was not employed in this example. The final product was comparable to that of Example I.

EXAMPLE VII

The procedure of Example I was repeated, using the following ingredients:

Waxy maize starch, acid converted to a degree known in the trade as 85 fluidity, and predried to—

| | Parts |
|---|---|
| 1.6% moisture content | 100 |
| 49.7% aqueous sodium hydroxide solution | 22.8 |
| 78% monochloracetic acid solution | 17.4 |

The final product was comparable to that of Example I.

EXAMPLE VIII

The ingredients were as follows:

Product of Example VII, dried to—

| | Parts |
|---|---|
| 1.33% moisture | 100 |
| 49.7% aqueous sodium hydroxide solution | 2.92 |
| Benzyl chloride | 4.62 |
| Glacial acetic acid | |

The base was sprayed onto the starch derivative in the manner previously described, and the benzyl chloride was poured in slowly. Agitation was maintained throughout the process. A total of about three hours heating was employed, the temperature being gradually raised to a maximum of 70–75° C. The temperature was then reduced to about 25° C. and glacial acetic acid was then sprayed onto the mass until the pH of a 40% aqueous solution of a sample was 10.0.

The product was comparable to that of Example I.

EXAMPLE IX

The ingredients were as follows:

| | Parts |
|---|---|
| Corn starch (predried to 1.28% moisture content) | 100 |
| Sodium carbonate solution, saturated at room temperature (approximately 22%) | 4.5 |
| Propylene oxide | 35 |

The reaction was conducted in an autoclave. The sodium carbonate solution was sprayed onto the starch, and then the propylene oxide was poured in slowly. A temperature of about 100–115° C. was maintained until the pressure dropped to about zero p. s. i. (gauge). The product, in the form of ungelatinized granules, dissolved readily in cold water to form stable, clear solutions with a pH of about 7, in 8% solution.

EXAMPLE X

The ingredients were as follows:

| | Parts |
|---|---|
| Corn starch (normal moisture content) | 100 |
| 25% aqueous sodium hydroxide solution | 3 |
| Propylene oxide | 25 |
| Glacial acetic acid | |

The procedure was the same as in Example IX. At the end of the reaction, the product was cooled to room temperature and sprayed with glacial acetic acid until the pH of a 10% aqueous solution was 9.2. The product, in the form of ungelatinized granules, dissolved readily in cold water to form stable, clear solutions.

The product was comparable to that of Example I.

EXAMPLE XI

The ingredients were as follows:

| | Parts |
|---|---|
| Corn starch | 100 |
| 40.7% aqueous sodium hydroxide solution | 25 |
| Ethyl chloride | 16.4 |

The reaction was conducted in an autoclave. The sodium hydroxide solution was sprayed onto the starch while the temperature was not permitted to rise above 23° C. The ethyl chloride was then introduced and the autoclave sealed. The temperature was gradually raised to 95–100° C. over a period of about three hours and was then held constant until the operating pressure dropped to a constant level (about three hours). A condenser was then attached to the autoclave and volatile material was removed by heating.

The product was comparable to that of Example I.

EXAMPLE XII

The ingredients were as follows:

| | Parts |
|---|---|
| Corn starch | 100 |
| 40.5% aqueous sodium hydroxide solution | 40 |
| Sodium hydroxide flakes | 8.66 |
| Ethylene chlorohydrin | 50 |

The sodium hydroxide solution was sprayed onto the corn starch while the temperature was maintained at a maximum of 22° C. The ethylene chlorohydrin was then sprayed in, the temperature being kept at a point not above 15° C. After two hours mixing at 20–25° C., the sodium hydroxide flakes were slowly dusted in, the temperature being maintained at a point not above 25° C. After mixing for one hour at 20–25° C., the reaction mixture was transferred to a closed container and allowed to stand at room temperature for two weeks.

The product was comparable to that of Example I.

EXAMPLE XIII

The ingredients were as follows:

| | Parts |
|---|---|
| Corn starch (predried to 2.75% moisture content) | 100 |
| 50% aqueous sodium hydroxide solution | 5.14 |
| 37.9% aqueous sodium 2-bromoethane-sulfonate solution | 70.8 |
| Sodium hydroxide flakes | 2.60 |

The procedure was essentially that of Example I. After the four hour period mentioned therein, the temperature was raised gradually to 100–105° C. and the reaction was completed at this temperature.

The moisture content of the final product was 4.49%, and its properties were comparable to the product of Example I.

EXAMPLE XIV

The ingredients were as follows:

| | Parts |
|---|---|
| Low-converted white corn dextrine having a solubility in water of less than 10%, at 72° F. (7.72% moisture) | 100 |
| 25% aqueous sodium hydroxide solution | 10.3 |
| 75% aqueous monochloracetic acid solution | 4 |

The procedure was essentially that of Example I, except that no nitrogen or other gas was circulated.

The product had a moisture content of 11.7%, and when mixed in water at room temperature a stable, semi-translucent, homogeneous dispersion was formed, which was relatively non-pasty and resistant to gelling. On the other hand, when the original dextrine (which was used as the raw material for this product) was mixed in water at room temperature, the major proportion settled out almost immediately. Both the original dextrine and final product showed polarization crosses when examined microscopically under crossed nicols.

EXAMPLE XV

The ingredients were the same as in Example I except that the 100 parts of corn starch were first blended with 9.3 parts of powdered sodium hydroxide. Maintaining constant agitation, the resultant blend was then sprayed with 14.8 parts of water (the amount of base and the amount of water thus added being equivalent to the 24.6 parts of 40% aqueous sodium hydroxide solution used in Example I). After about five minutes, there were added, by spraying, 16 parts of a 75% aqueous solution of monochloroacetic acid, and the remainder of the process was identical with that of Example I. The properties of the final product were comparable with those of Example I.

EXAMPLE XVI

Example XV was repeated, using the same ingredients, proportions and procedures, except that the corn starch was blended with flake sodium hydroxide instead of the powder, and the blend was then ground in order to obtain a homogeneous powdered mass, and the ground material was then returned to the blender and sprayed with water, as indicated in Example XV. The remaining steps were exactly the same as those of Example XV and the final product was comparable in properties to the product of that example.

Some of the advantages of our process and product will have become apparent from a reading of the foregoing description. These advantages, as compared to prior methods and materials of this type, include the following:

(a) Reduction in the amount of reagent required. The relatively small amount of water present during the reaction tends to reduce loss of reagent due to by-product formation.

(b) Preparation of a relatively pure and dry product without post-reaction treatment. As a result of the small amount of water present during our reaction, there is no need for separating the final product from a fluid medium. As already explained, our reaction mixture is a crumbly, granular mass, and never an aqueous suspension or dispersion. On the other hand, a reaction wherein starch is in aqueous suspension would require filtration and drying, and if a dispersion of gelatinized starch in water were involved, the product would have to be subjected to an expensive precipitation process or to drum drying to remove water. The alternative would be to sell and transport the product in liquid form—obviously economically undesirable. Furthermore, there is rarely need for purification of our final product, because of the already mentioned reduction in by-product formation, and also because our process, unlike some prior methods, does not ordinarily require the use of any considerable excess of base. It must be emphasized, in this connection, that our final product is soluble in cold water per se. In other words, even in those cases where our final product contains excess base, and this base is removed by neutralization, the remaining product is nevertheless still soluble in cold water, since its solubility does not depend upon the presence or absence of residual base.

(c) Relatively simple equipment is required. When treating gelatinized starches, expensive heavy duty mixers are often required. On the other hand, our material being granular and non-pasty, is relatively easy to handle and mix.

(d) Our product dissolves in cold water more readily and with less lump formation than the hitherto known gelatinized starch types. It is believed that this is due to the fact that the starch granules of our product are intact and, therefore, tend to absorb water more uniformly and slowly than a starch material whose granule structure has been disrupted and dispersed.

(e) Our product forms aqueous solutions which are generally clearer and have less tendency to gel than those formed by non-etherified, cold water soluble starches.

We claim:

1. The method of making an ungelatinized, cold water soluble starch ether which consists, in reacting a mixture of starch, an etherification reagent, a base and water, the base being present in the form of fine particles of an aqueous solution having a concentration of from 10% to 80%, the water being present in an amount less than that which will permit suspension of the starch and in an amount to make a base solution of said concentration, the base being in an amount from 0.5% up calculated as dry weight of the base upon the dry weight of the starch, the said base functioning to swell but not to gelatinize the starch granules, and the etherification reagent being in an amount of from 1% to 62% based on the weight of the starch and functioning to render the swelled but ungelatinized starch granules cold water soluble.

2. The method of claim 1, in which the base is added to the starch in the form of fine particles of an aqueous solution.

3. The method of claim 1, in which the etherification reagent also is added in particle form.

4. The method of claim 1, in which the major proportion of the base is added in the form of fine particles of an aqueous solution, the remainder being added in the form of solid particles.

5. The method of claim 1, in which the base is added to the starch in the form of an aqueous solution, having a concentration of from 10% to 80%.

6. The method of claim 1, in which the base, dry, is first blended with the starch and sufficient water is then admixed with the starch, so that the total amount of base and the total amount of added water are equivalent to an aqueous solution of the base, having a concentration of from 10% to 80%.

References Cited in the file of this patent

UNITED STATES PATENTS

| 2,116,867 | Kreimeier et al. | May 10, 1938 |
| 2,516,634 | Kesler et al. | July 25, 1950 |
| 2,682,535 | Broderick | June 29, 1954 |
| 2,773,057 | Hyermstad et al. | Dec. 4, 1956 |

FOREIGN PATENTS

| 564,585 | Great Britain | Oct. 4, 1944 |